US008923799B2

(12) United States Patent
Cordero

(10) Patent No.: US 8,923,799 B2
(45) Date of Patent: Dec. 30, 2014

(54) METHOD AND SYSTEM FOR AN AUTOMATED DISPATCH PROTOCOL

(75) Inventor: Jose Cordero, Livingston, NJ (US)

(73) Assignee: The Cordero Group, Lyndhurst, NJ (US)

( * ) Notice: Subject to any disclaimer, the term of this patent is extended or adjusted under 35 U.S.C. 154(b) by 126 days.

(21) Appl. No.: 13/107,260

(22) Filed: May 13, 2011

(65) Prior Publication Data

US 2011/0281547 A1 Nov. 17, 2011

Related U.S. Application Data

(60) Provisional application No. 61/334,760, filed on May 14, 2010.

(51) Int. Cl.
*H04M 11/04* (2006.01)
*G08B 27/00* (2006.01)

(52) U.S. Cl.
CPC .................................... *G08B 27/001* (2013.01)
USPC ................ 455/404.1; 455/404.2; 340/539.12; 340/539.13; 340/539.18

(58) Field of Classification Search
CPC ..... H04W 76/007; H04W 4/22; H04M 11/04; H04M 2242/04
USPC ........................... 455/404.1–404.2, 518, 519; 340/539.12–539.13, 539.18
See application file for complete search history.

(56) References Cited

U.S. PATENT DOCUMENTS

| | | | | |
|---|---|---|---|---|
| 7,937,068 | B2 * | 5/2011 | Hogberg et al. | 455/404.2 |
| 2004/0212505 | A1 * | 10/2004 | Dewing et al. | 340/573.1 |
| 2005/0078174 | A1 * | 4/2005 | Casey et al. | 348/61 |
| 2007/0150140 | A1 * | 6/2007 | Seymour | 701/35 |
| 2008/0064363 | A1 * | 3/2008 | Salafia et al. | 455/404.1 |
| 2009/0186596 | A1 * | 7/2009 | Kaltsukis | 455/404.2 |
| 2010/0158202 | A1 * | 6/2010 | Johnson et al. | 379/45 |

* cited by examiner

*Primary Examiner* — Wayne Cai
(74) *Attorney, Agent, or Firm* — Arent Fox LLP

(57) ABSTRACT

A method and system for an automated dispatch protocol are described. Display information may be generated for multiple dispatch schemes that correspond to different types of emergency responses. Once a dispatch scheme is selected, a computer-aided dispatcher (CAD) may generate electronic broadcast instructions that are to be wirelessly transmitted to one or more emergency responders. The dispatch scheme selection may be in response to an input provided by an operator of a viewing station in which the display information is presented. One or more signals may be generated such that the CAD and/or an emergency responder locator can identify the emergency responders to be dispatched. The signals may include incident location information received from an emergency service and/or incident location information computed from coordinate information received from one or more sensors.

25 Claims, 10 Drawing Sheets

METHOD AND SYSTEM FOR AN AUTOMATED DISPATCH PROTOCOL

CROSS-REFERENCE TO RELATED APPLICATIONS/INCORPORATION BY REFERENCE

This application claims priority to and makes reference to U.S. Provisional Patent Application Ser. No. 61/334,760 filed on May 14, 2010.

The above stated application is hereby incorporated herein by reference in its entirety.

FIELD OF TECHNOLOGY

Certain embodiments of the disclosure relate to emergency dispatch systems. More specifically, certain embodiments of the disclosure relate to a method and system for an automated dispatch protocol.

BACKGROUND

Responding to emergency incidents in a timely manner is an important function of agencies and/or entities that are charged with protecting public safety. The public's well being may depend on how quickly first responders are able to arrive at the scene of a critical incident or emergency. Often times, the opportunity to save lives, prevent crimes, prevent the destruction of property, and/or avert or mitigate other public safety threats can be measured in minutes. Thus, reducing the time between the notification of a critical incident and the arrival at the scene by the first responders, such as the police, the fire department, and/or other emergency personnel, for example, may result in a significant benefit to the public.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A system and/or method is provided for an automated dispatch protocol, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1A:
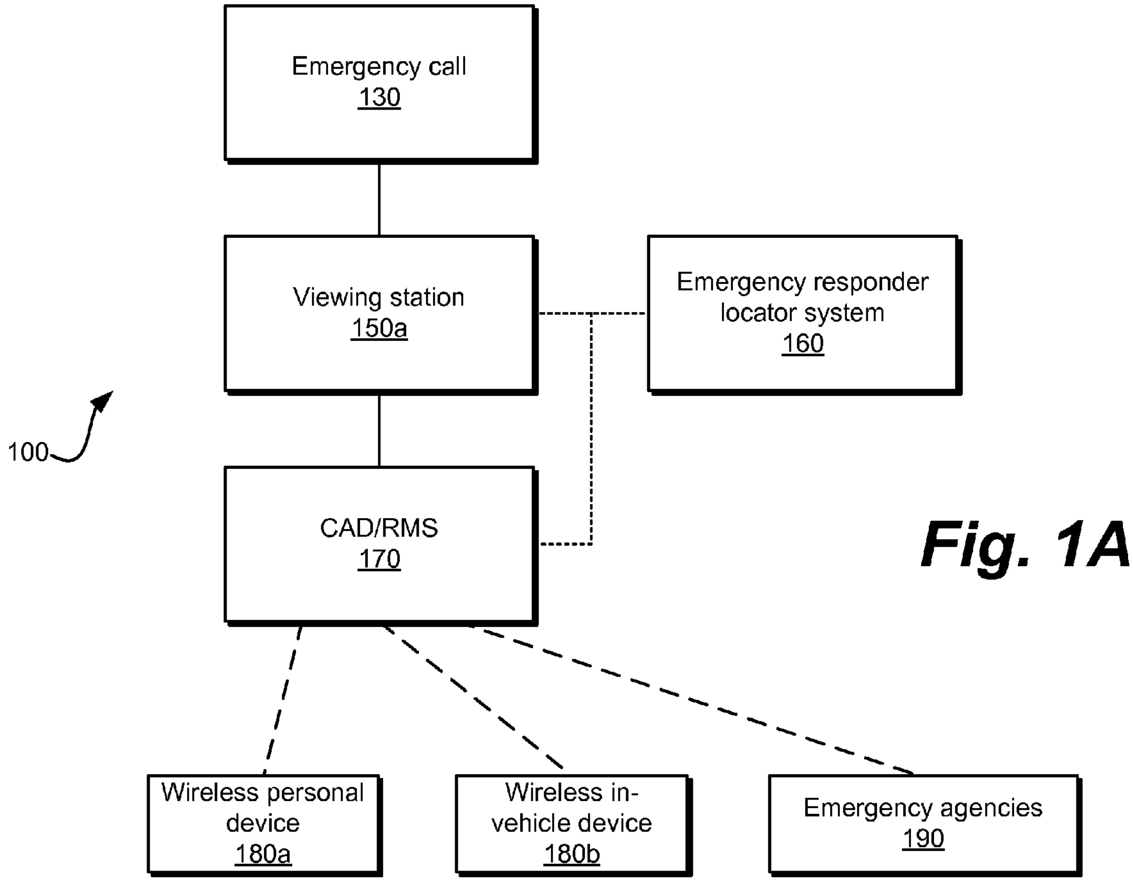
FIGS. 1A and 1B are block diagrams that illustrate emergency dispatch systems, in accordance with embodiment of the disclosure.

Certain embodiments of the disclosure may be found in a method and system for an automated dispatch protocol. Various embodiments of the disclosure provide for display information to be generated for multiple dispatch schemes that correspond to different types of emergency responses. Once a dispatch scheme is selected, a computer-aided dispatcher (CAD) may generate electronic broadcast instructions that are to be wirelessly transmitted to one or more emergency responders. The dispatch scheme selection may be in response to an input provided by an operator of a viewing station in which the display information is presented. One or more signals may be generated such that the CAD and/or an emergency responder locator (ERL) can identify the emergency responders to be dispatched. The signals may include incident location information received from an emergency service and/or incident location information computed from coordinate information received from one or more sensors.

Another embodiment of the disclosure may provide for a non-transitory computer readable media having stored thereon a computer program that comprises at least one code section for handling emergency responses in accordance with an automated dispatch protocol.

With respect to emergency situations, a significant amount of public policy attention has been paid to the overall response time of an emergency responder as a measure of performance of the agency or entity with which the emergency responder is associated. The reasoning underlying the importance of a rapid response to emergency calls is based on, for example, the notion that rapid responses prevent injury and protect property; that rapid police responses to ongoing criminal incidents increase the probability of arrest, and that rapid emergency responses satisfy the public's expectations of nearly immediate assistance to an emergency situation.

The most commonly used method for requesting emergency services is the emergency 911 system. Other citizen-initiated contact methods may include non-emergency business telephone lines, communicating with an officer/responder on the street, appearing at a police/fire station, and/or contacting a public safety agency by some other means. With the emergence of public safety technology, such as closed-circuit television (CCTV) and/or smart sensors, for example, system operators may also be in a position to initiate requests for emergency responses.

In a typical public safety or emergency call center, once a request for an emergency response is made through the emergency 911 system or through some other method, public safety call takers/dispatchers create a record of the request by entering pertinent information into a CAD or similar system. In many instances, key pieces of caller information may be automatically transferred from the emergency 911 system to the CAD system. The CAD system may then record the information pertaining to dispatched calls, including call handling and response times. Based on information collected from the caller, emergency call center dispatchers may assign a degree of urgency or a priority to the incident.

Public safety agencies may prioritize calls for service based on the department's judgment about the emergency nature of the call (e.g., harm to a person imminent; crime in progress). Incident priority schemes can vary across agencies and throughout the country, and may include multiple levels of priorities. Typically, priority one calls, also referred to as high priority calls, relate to emergencies or in-progress criminal activities where immediate intervention is necessary to avert serious injury, extensive property damage, and/or to effect criminal apprehension of a violent felon. There is a correlation between the urgency of the reported event and citizen expectation of a rapid emergency response. The more serious, life-threatening the events are, the quicker a citizen expects the response to be.

Emergency 911 dispatchers typically utilize emergency public safety radio communication systems to locate and assign available emergency responders consistent with the urgency of the call. Most police departments and public safety agencies require that the officers responding to an event provide a report of on-scene or arrival times to the communications center. Dispatchers can then create a record of arrival times by entering the information into the CAD system.

Emergency responders typically measure response times to emergency calls or to incidents on the basis of stack time, dispatch time, and travel time. Stack time generally refers to how much time it takes between emergency 911 call-takers or dispatchers receiving a request for emergency assistance from the public, or by some other means, and the time when an responder is available to be dispatched. Dispatch time typically includes stack time and the time it takes to locate and dispatch a responder. Travel time refers to the time it takes between the dispatching of emergency responders and the arrival of those emergency responders at the scene of the incident. True response time, however, may be a more appropriate representation or measure of emergency response times. True response time refers to the overall response time, that is, the total of the dispatch time and the travel time. Therefore, the true response time is a measure of time from when the public contacts an emergency service, and the public safety dispatcher determining that an emergency response is necessary, to the actual arrival of assistance.

Although a national standard for emergency service response times is not available, a suggested standard time for emergency dispatch time is one minute or less, and for response time to emergency calls is five minutes or less. Public safety response time goals to non-emergency calls for service are generally a result of local policies and call for service management plans.

In reality, the response time of police departments and other public safety agencies to emergency calls for service vary greatly and quite often exceed agency and industry goals by a large margin. While agency/industry emergency incident response time goals cannot always be achieved for a variety of reasons, excessive response times may be reduced by employing the automated dispatch protocols described herein. The use of an automated dispatch protocol may allow the integration of various public safety technology systems to produce a seamless and rapid emergency dispatch operation.

To reduce emergency response times, public safety agencies may need to cut either dispatch times or travel times, or both. The dispatch time may be reduced, in some instances significantly, by enabling the integration and/or simplifying those operations that make dispatch functions time consuming. The emergency dispatch function typically entails a multi-step process that includes, but is not limited to, receiving and processing a call or request for emergency assistance, attempting to locate available responders via radio broadcast or other forms of communication, radio broadcasting of assignment, and field unit acknowledgement of assignment over radio communication. The process can take several minutes to complete depending on several factors such as the dispatching technology, the communications traffic, the call volume, and/or the availability of resources, for example.

Previous attempts to reduce overall response time or true response time have focused on personnel staffing and aligning resources with workload. Such approach is typically cost prohibitive and not always very effective. Instead, one or more embodiments of an automated dispatch protocol as described herein may be implemented in an emergency dispatch system, which may be utilized to reduce dispatch times by, for example, eliminating or reducing the need for broadcast-based available unit search, radio broadcast of assignment, and/or radio acknowledgement of assignment. While in some embodiments of the disclosure a radio broadcast may accompany electronic assignment, such radio broadcast complements the response operation but need not delay the dispatch time. By utilizing an automated dispatch protocol in an emergency dispatch system, it may be possible to produce shorter response times without the investment in additional resources. When the operation of the automated dispatch protocol is integrated with the operation of an Automated Vehicle Locator (AVL) system or an Emergency Responder Locator (ERL) system, it may be possible to also reduce the travel time that takes for emergency responders to reach the location of the incident, which may further reduce the overall or true response time.

By implementing an automated dispatch protocol the dispatch time and/or the travel time may be reduced by allowing electronic emergency unit or emergency responder dispatch assignments to be generated according to predetermined dispatch schemes within a web-based interface, and/or within a graphical user interface associated with a CAD system, an AVL system, an ERL system, and/or other like system.

A public safety agency may determine one or more dispatch schemes that may be programmed into an automated dispatch protocol so that emergency units or emergency responders can be dispatched in a manner that is consistent and appropriate with the nature of the emergency. For example, a predetermined emergency response scheme may entail having one or more predetermined initial response units, the actual number of initial response units varying according to the nature of the assignment and/or the geographical area of the incident. An automated dispatch protocol may enable the use of CAD systems or other like systems to implement such emergency response or dispatch schemes based on the public safety agency requirements. Emergency response schemes may comprise multiple options for assigning appropriate response units and/or personnel based on availability so that when one or more designated responders are not available, the next responder on the scheme that is available may be dispatched. In some embodiments of the disclosure, such as when the CAD system does not provide for such flexibility in the implementation of an emergency response scheme, some or all of the functions of the emergency response scheme that would otherwise had been implemented in the CAD system may be implemented within the automated dispatch protocol.

Figure 1B:
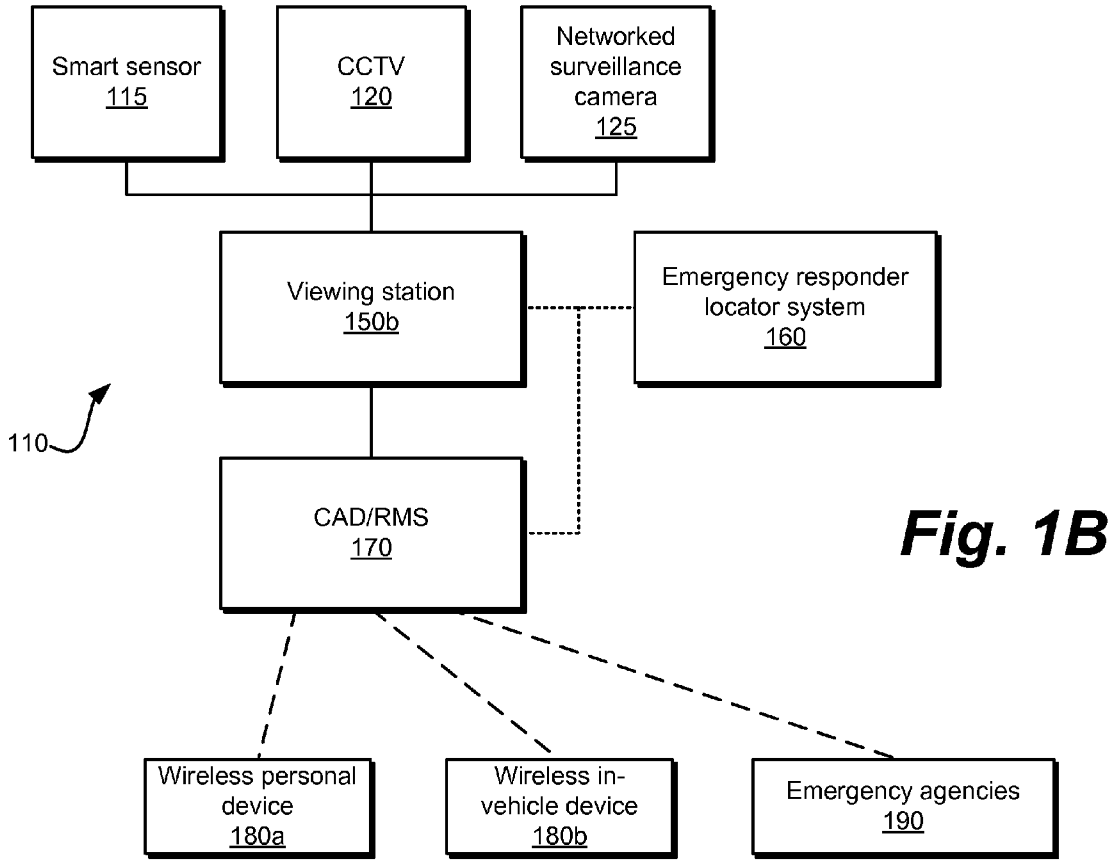

FIGS. 1A and 1B are block diagrams that illustrate emergency dispatch systems, in accordance with embodiment of the disclosure. Referring to FIG. 1A, there is shown an emergency dispatch system 100 that may comprise a viewing station 150*a* and a CAD and Records Management System (CAD/RMS) 170. The viewing station 150*a* and the CAD/RMS 170 may be located in an operations room and/or control room of a public safety agency, such as a police station, a fire station, a security office in a public or private facility, and/or some other emergency agency. The viewing station 150*a* may be operable as an automated dispatch protocol activation point, that is, some or all of the operations and/or functions associated with an automated dispatch protocol may be performed in the viewing station 150*a*. The disclosure, however, need not be so limited. In some embodiments of the disclosure, the operations and/or functions of the automated dispatch protocol may be performed in one or more of components and/or systems of the emergency dispatch system 100 other than the viewing station 150*a*. In some embodiments of the disclosure, the operation of the automated dispatch protocol may be distributed between two or more components and/or systems of the emergency dispatch system 100.

Also shown in FIG. 1A are one or more wireless personal devices 180*a*, one or more wireless in-vehicle devices 180*b*, and one or more emergency agencies 190. A wireless personal device 180*a* may be carried by an emergency responder on patrol (e.g., police officer, security officer) fore receiving communication, including dispatch instructions. A wireless in-vehicle device 180*b* may be located in an emergency unit or emergency responder, such as a public safety agency vehicle, for example. A wireless device may refer to a computing device (e.g., laptop, mobile phone, smart phone, personal digital assistant, tablet, or the like) that is operable to communicate wirelessly. As noted above, the emergency unit or emergency responder may correspond to emergency personnel and the wireless computer may be carried and/or operated by such personnel. The emergency agencies 190 may refer to other agencies, such as fire departments, emergency medical services, or otherwise, which have emergency responders that are to be dispatched in a particular emergency situation in accordance with local operations rules. Although not shown in FIG. 1A, the CAD/RMS 170 may comprise and/or may be communicatively coupled to a system that is operable to wirelessly communicate with the one or more wireless personal devices 180*a*, the one or more wireless in-vehicle devices 180*b*, and the one or more emergency agencies 190.

In some embodiments of the disclosure, the emergency dispatch system 100 may also comprise an ERL system 160. The ERL system 160 may be operable to locate and/or identify emergency responders, whether they be emergency units (e.g., police cars) and/or personnel (e.g., officers on patrol), for dispatching to a particular emergency situation. The ERL system 160 may receive and update information related to the location of emergency responders. Such information may be in the form of navigation system information such as Global Positioning System (GPS) information, for example. The ERL system 160 may receive instructions from the automated dispatch protocol as to the location of the incident and/or the type of incident so that the ERL system 160 can identify the appropriate emergency responders. The emergency responders may be selected based on direct line calculations or dynamic calculations. Direct line calculations refer to the shortest distance between an emergency responder and the incident location, while dynamic calculations may account for traffic, road, and/or other travel-related considerations.

When an ERL system is not available as part of the emergency dispatch system 100, the emergency responders that are to be provided with dispatch instructions may be predetermined based on the incident location and/or the type of incident. For example, particular emergency units or emergency responders have certain geographical assignments and will be provided with dispatch instructions when an incident occurs within their assigned region. When an ERL system is not available, the CAD/RMS 170 may determine which emergency responders are to be provided with dispatch instructions based on the information that is provided by the automated dispatch protocol.

The emergency call 130 may correspond to an emergency call service such as an emergency 911 service or a wireless 911 service, for example. When a 911 call is received, an operator of the emergency dispatch system 100 handles the call and determines whether the call requires activation of the automated dispatch protocol. When such activation is required based on the information provided by the caller, the operator activates the automated dispatch protocol and is presented with multiple dispatch schemes related to the protocol. The operator may classify the call and may select one of the dispatch schemes accordingly. The automated dispatch protocol may generate one or more signals that are provided to the CAD/RMS 170 and/or to the ERL SYSTEM 160 to locate and/or identify the appropriate emergency responders so that an electronic dispatch instruction may be transmitted to a wireless device associated with those emergency responders.

In some embodiments of the disclosure, portions of the automated dispatch protocol may be implemented in the viewing station 150*a*, the CAD/RMS 170, and/or the ERL SYSTEM 160. Moreover, in some embodiments of the disclosure, at least portions of the viewing station 150*a*, the CAD/RMS 170, and/or the ERL SYSTEM 160 may be integrated together.

Referring to FIG. 1B, there is shown an emergency dispatch system 110 that may comprise a viewing station 150*b* and the CAD/RMS 170. Like the viewing station 150*a* described above, the viewing station 150*b* may also be operable as an activation point for an automated dispatch protocol. In some embodiments of the disclosure, the emergency dispatch system 110 may also comprise the ERL SYSTEM 160. Also shown are the one or more wireless personal devices 180*a*, the one or more wireless in-vehicle devices 180*b*, and the one or more emergency agencies 190.

The emergency dispatch system 110 may comprise various peripheral devices and/or systems such as a smart sensor 115, a CCTV 120, and/or a networked surveillance camera 125. The peripheral devices and/or systems may be utilized to collect information, process data, monitor events, and/or provide services that cover a geographic region that is supported by the public safety agency operating the emergency dispatch system 110. In some embodiments of the disclosure, the emergency dispatch system 110 may be operable to support multiple smart sensors 115, multiple CCTVs 120, and/or multiple networked surveillance cameras 125.

The network surveillance camera 125 may correspond to an Internet Protocol (IP)-based surveillance camera, for example. The smart sensor 115 may comprise sensors that may be operable to provide some front-end processing operations of the sensed data. For example, the smart sensor 115 may comprise smart cameras that perform pre-processing of captured video data. In some embodiments of the disclosure, smart cameras may also be networked with the network surveillance cameras 125. The smart sensors 115 may also comprise audio sensors such as gunshot detectors, for example.

When a video feed is received from any of the peripheral devices and/or systems, an operator of the emergency dispatch system 110 may analyze the video feed and may determine whether an incident captured by the video feed requires activation of the automated dispatch protocol. When such activation is required based on the information being provided by the video feed, the operator activates the automated dispatch protocol and is presented with multiple dispatch schemes related to the protocol. The operator may classify the incident and may select one of the dispatch schemes accordingly. The automated dispatch protocol may generate one or more signals that are provided to the CAD/RMS 170 and/or to the ERL SYSTEM 160 to locate and/or identify the appropriate emergency responders so that an electronic dispatch instruction may be transmitted to a wireless device associated with those emergency responders.

In some embodiments of the disclosure, portions of the automated dispatch protocol may be implemented in the viewing station 150*b*, the CAD/RMS 170, and/or the ERL SYSTEM 160. Moreover, in some embodiments of the disclosure, at least portions of the viewing station 150*b*, the CAD/RMS 170, and/or the ERL SYSTEM 160 may be integrated together.

Each of the components and/or systems shown in FIGS. 1A and 1B may be software-based (e.g., set of instructions executable at a processor, software code), hardware-based (e.g., circuit system, processor, application-specific integrated circuit (ASIC), field programmable gate array (FPGA)), or a combination thereof. In some embodiments of the disclosure, some or all of the operations and/or functionality of one or more of the components and/or systems shown in FIGS. 1A and 1B may be combined in one component and/or system.

In some embodiments of the disclosure, a single emergency dispatch system may be operable to handle one or more emergency calls 130, as well as one or more smart sensors 115, one or more CCTVs 120, and/or one or more networked surveillance cameras 125.

Figure 2A:
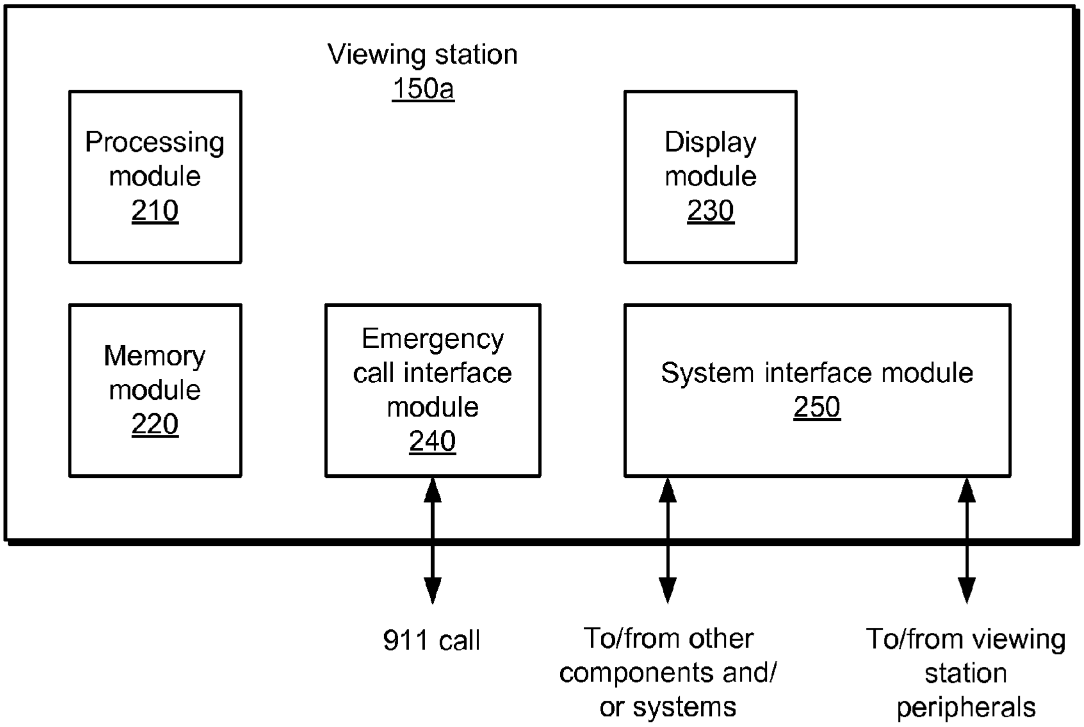
FIGS. 2A and 2B are block diagrams that illustrate configurations of a viewing station in an emergency dispatch system, in accordance with embodiments of the disclosure.
Figure 2B:
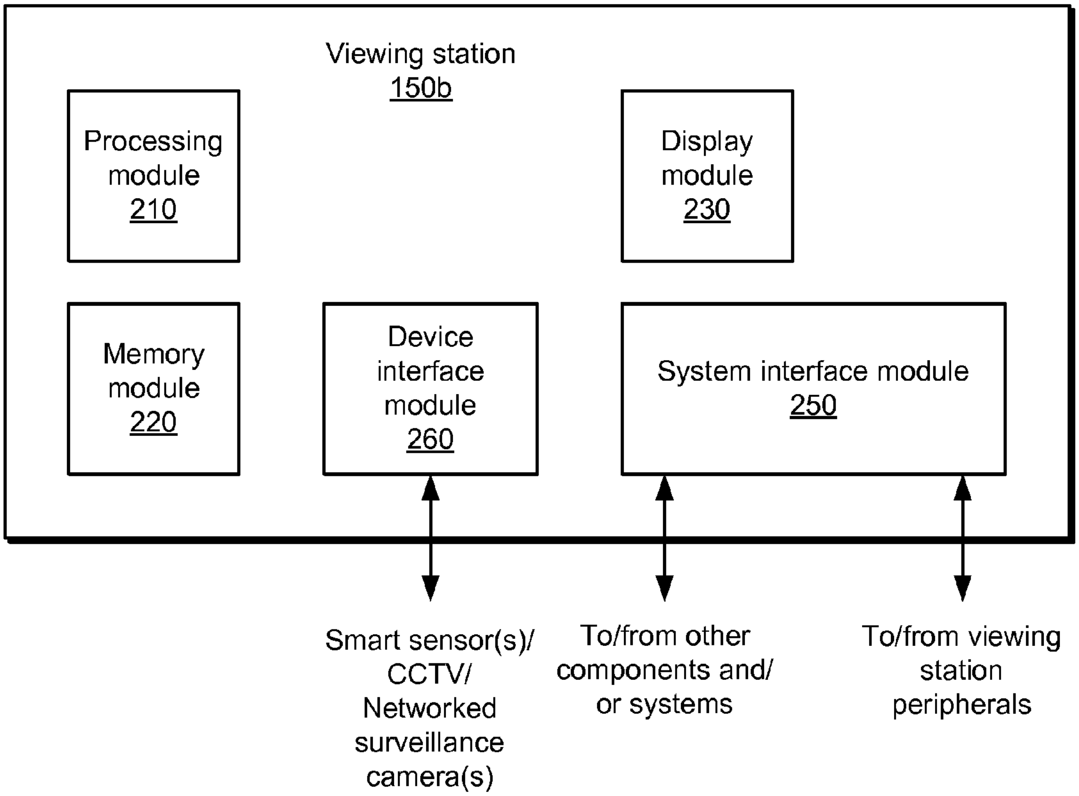

FIGS. 2A and 2B are block diagrams that illustrate configurations of a viewing station in an emergency dispatch system, in accordance with embodiments of the disclosure. Referring to FIG. 2A, the viewing station 150*a* of the emergency dispatch system 100 may comprise a processing module 210, a memory module 220, a display module 230, an emergency call interface module 240, and a system interface module 250. In addition to providing support for various typical viewing station operations (e.g., displaying emergency call data, operator input, receiving/transmitting data), the processing module 210, the memory module 220, the display module 230, the emergency call interface module 240, and/or the system interface module 250 may be operable to perform one or more automated dispatch protocol functions and/or operations.

The processor module 210 may be operable to control the operations of the viewing station 150*a* and to control one or more of the operations and/or functions associated with the automated dispatch protocol. The memory module 220 may be operable to store information, including but not limited to information received and/or computed in connection with the automated dispatch protocol. The display module 230 may be operable to control a display device and/or to generate graphical information that is to be presented in the display device. The emergency call interface module 240 may be operable to receive emergency calls and data associated with those calls such as incident location information. The system interface module 260 may be operable to communicate and/or process data to/from other components and/or systems such as the CAD/RMS 170 and/or the ERL system 160. The system interface module 260 may be operable to communicate and/or process data to/from devices peripheral to the viewing station 150*a* such as a display device (not shown), a keyboard (not shown), and/or other operator input/output devices, for example.

Each of the modules described above in the viewing station 150*a* may be software-based (e.g., set of instructions executable at a processor, software code), hardware-based (e.g., circuit system, processor, ASIC, FPGA), or a combination thereof. In some embodiments of the disclosure, some or all of the operations and/or functionality of one or more of the modules of the viewing station 150*a* may be combined in one module.

Referring to FIG. 2B, the viewing station 150*b* of the emergency dispatch system 110 may comprise the processing module 210, the memory module 220, the display module 230, a device interface module 260, and the system interface module 250. In addition to providing support for various typical viewing station operations (e.g., displaying emergency call data, operator input, receiving/transmitting data), the processing module 210, the memory module 220, the display module 230, the system interface module 250, and/or the device interface module 260 may be operable to perform one or more automated dispatch protocol functions and/or operations. The device interface module 260 may be operable to communicate and/or process data to/from one or more smart sensors 115, one or more CCTVs 120, and/or one or more networked surveillance cameras 125.

Each of the modules described above in the viewing station 150*b* may be software-based (e.g., set of instructions executable at a processor, software code), hardware-based (e.g., circuit system, processor, ASIC, FPGA), or a combination thereof. In some embodiments of the disclosure, some or all of the operations and/or functionality of one or more of the modules of the viewing station 150*b* may be combined in one module.

In some embodiments of the disclosure, a single viewing station may be operable to handle one or more emergency calls 130, as well as one or more smart sensors 115, one or more CCTVs 120, and/or one or more networked surveillance cameras 125.

Figure 3:
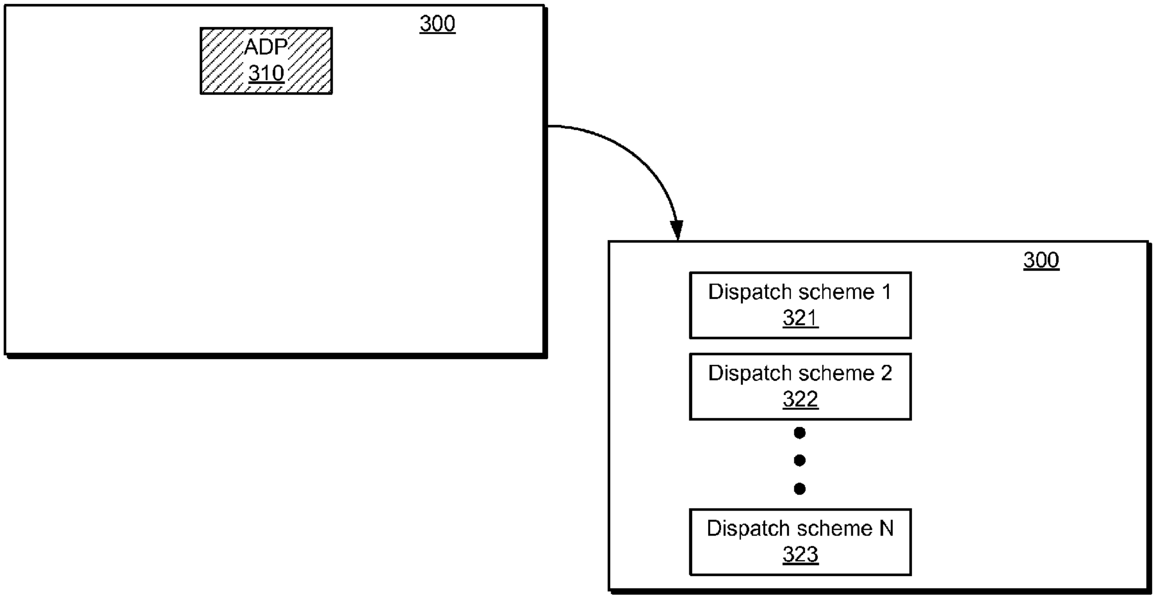
FIG. 3 is a diagram that illustrates a graphical user interface for activating an automated dispatch protocol, in accordance with an embodiment of the disclosure.

FIG. 3 is a diagram that illustrates a graphical user interface (GUI) for activating an automated dispatch protocol, in accordance with an embodiment of the disclosure. Referring to FIG. 3, there is shown a GUI 300 that may be presented in a display device associated with the emergency dispatch systems 100 and 110 described above with respect to FIGS. 1A and 1B, respectively. The GUI 300 may comprise multiple graphics and may include a graphical icon 310 for activating an automated dispatch protocol. As noted above, in response to information provided by a caller or content presented in a video feed, the operator of an emergency dispatch system may determine that a current incident requires the activation of an automated dispatch protocol. The operator may select the graphical icon 310 to activate the automated dispatch protocol. Once activated, the GUI 300 may change and may display multiple dispatch schemes associated with the automated dispatch protocol. In the example shown in FIG. 3, dispatch schemes 1, 2, . . . , N are presented using graphical icons 312, 322, . . . , 323.

In one example, for an automated dispatch protocol to be used in a police station emergency dispatch system, once the automated dispatch protocol is activated, the GUI 300 may display separate dispatch schemes icons labeled "Robbery," "Assault," "Fire," and "Medical," each of which corresponds to a different emergency situation and each having a particular set of rules as to the number and/or type of emergency responders that are to be provided with dispatch instructions. The operator classifies the incident and selects the appropriate dispatch scheme icon from the GUI 300. Subsequently, the automated dispatch protocol generates signals for the CAD/RMS 170 and/or the ERL SYSTEM 160 so that the appropriate emergency responders are dispatched.

Figure 4:
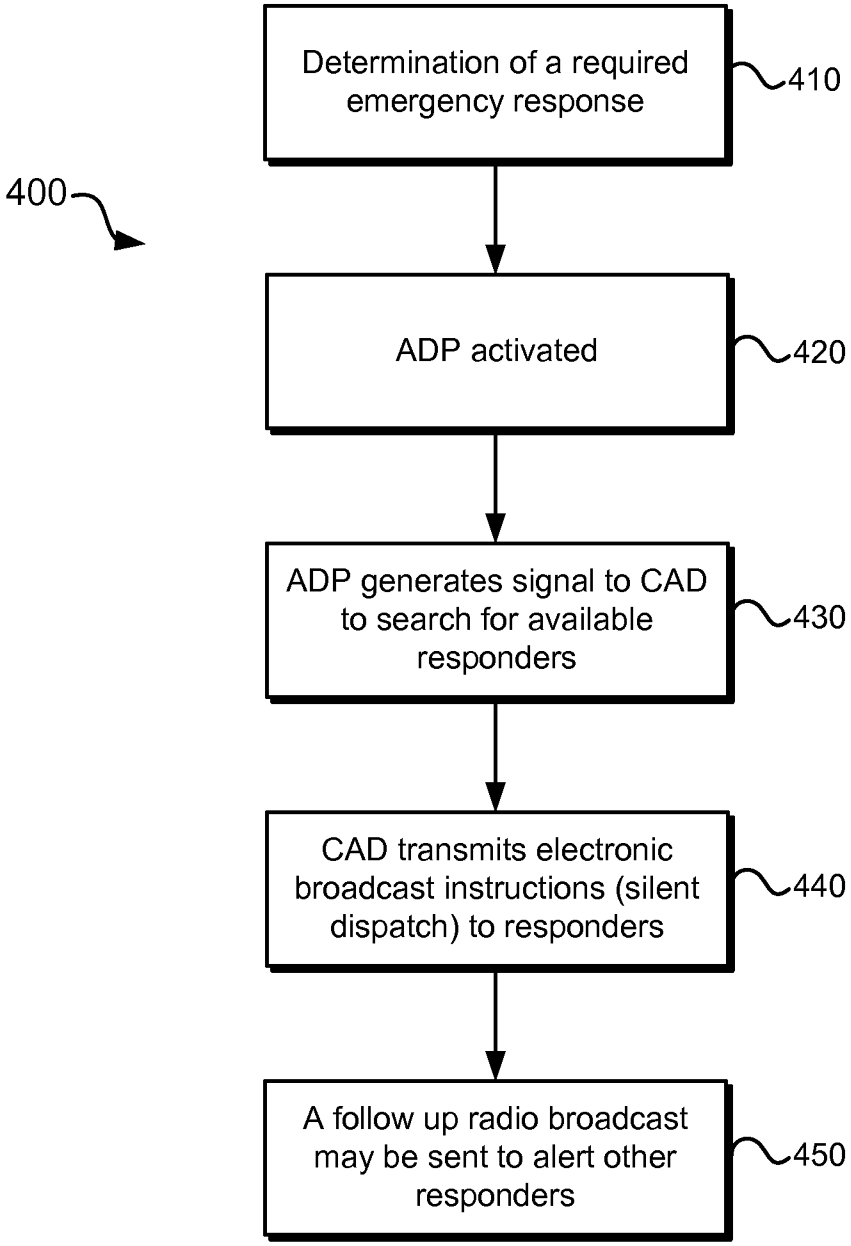
FIG. 4 is a flow chart that illustrates activation of an automated dispatch protocol, in accordance with an embodiment of the disclosure.

FIG. 4 is a flow chart that illustrates activation of an automated dispatch protocol, in accordance with an embodiment of the disclosure. Referring to FIG. 4, emergency call takers, dispatchers, CCTV/smart sensor operators, and/or the like may determine that an emergency response is required at 410. At 420, an automated dispatch protocol may be activated at an activation point such as the viewing stations 150*a* and 150*b*. At 430, the automated dispatch protocol may generate one or more signals, instructions, and/or commands to the CAD/RMS 170, for example, to activate a search for the appropriate emergency responders within the predetermined dispatch scheme selected at the activation point. At 440, once the appropriate emergency responders are identified, the CAD/RMS 170 may generate and transmit electronic broadcast instructions (e.g., silent dispatch) to those responders. At 450, in some embodiments of the disclosure, the operations of the automated dispatch protocol may be followed by radio broadcast to alert other emergency responders in the area. While these radio broadcasts may follow the automated dispatch protocol, such radio broadcast complement the emergency response and do not delay the dispatching function.

Figure 5:
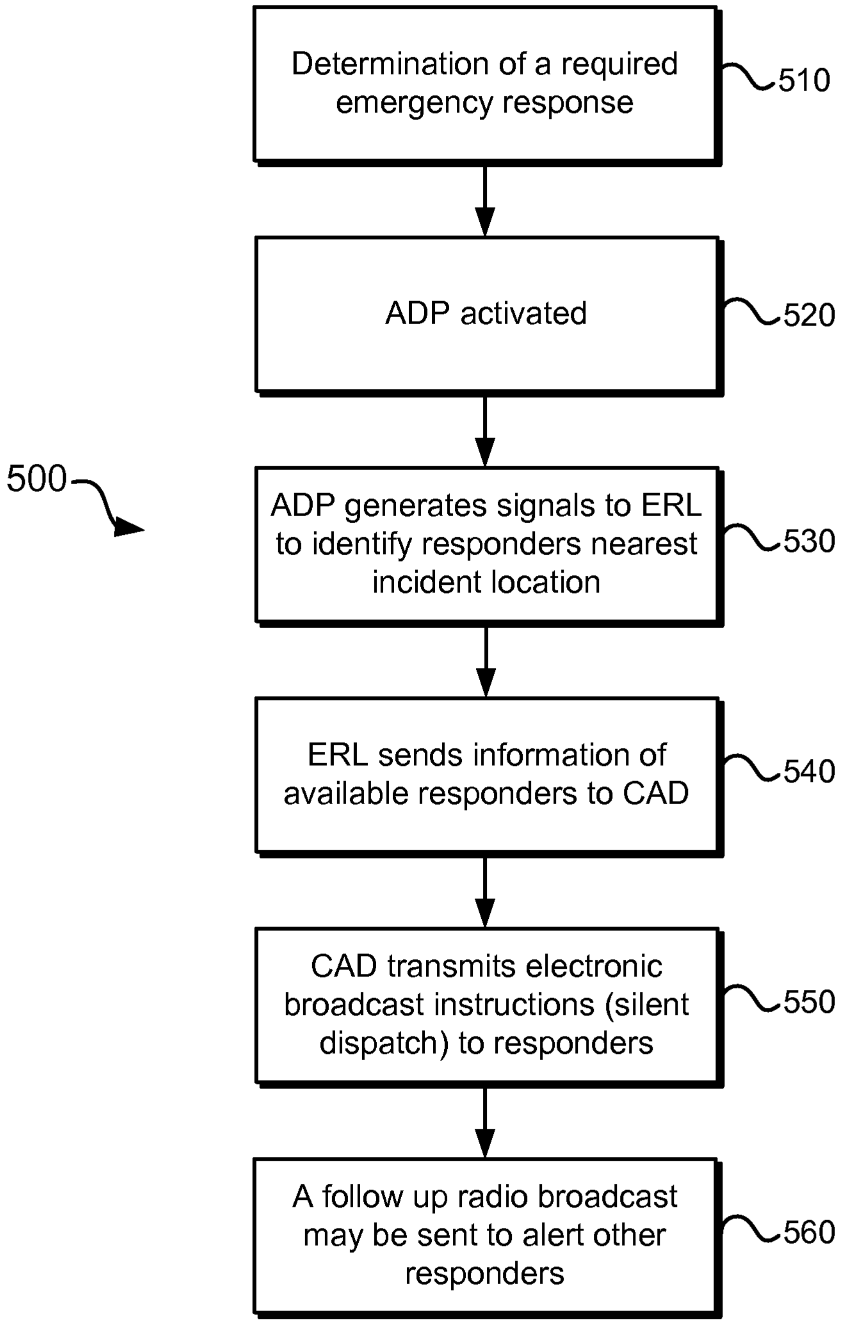
FIG. 5 is a flow chart that illustrates activation of an automated dispatch protocol that utilizes an emergency responder locator, in accordance with an embodiment of the disclosure.

FIG. 5 is a flow chart that illustrates activation of an automated dispatch protocol that utilizes an emergency responder locator, in accordance with an embodiment of the disclosure. Referring to FIG. 5, when the automated dispatch protocol is integrated with and/or operated in connection with an ERL such as the ERL SYSTEM 160, for example, the automated dispatch protocol may utilize the positioning or location services (e.g., GPS) available to the ERL to locate, identify, and dispatch the closest and/or the fastest available emergency responders to the incident. In this manner, critical seconds or minutes may be saved from travel time. After a determination is made at 510 that an emergency response is required, and after the automated dispatch protocol is activated at 520, the automated dispatch protocol may generate, at 530, one or more signals, instructions, and/or commands to the ERL system 160 such that information can be collected and the type of incident and the incident location may be displayed on a map. The ERL system 160 may identify an appropriate number of available emergency responders that are nearest the location of the incident and/or that can more rapidly reach the location of the incident. At 540, the ERL system 160 may generate and transmit a list of emergency responders to the CAD/RMS 170. At 550, the CAD/RMS 170 may then provide an automated electronic emergency dispatch. At 560, in some embodiments of the disclosure, the operations of the automated dispatch protocol may be followed by radio broadcast to alert other emergency responders in the area.

Figure 6:
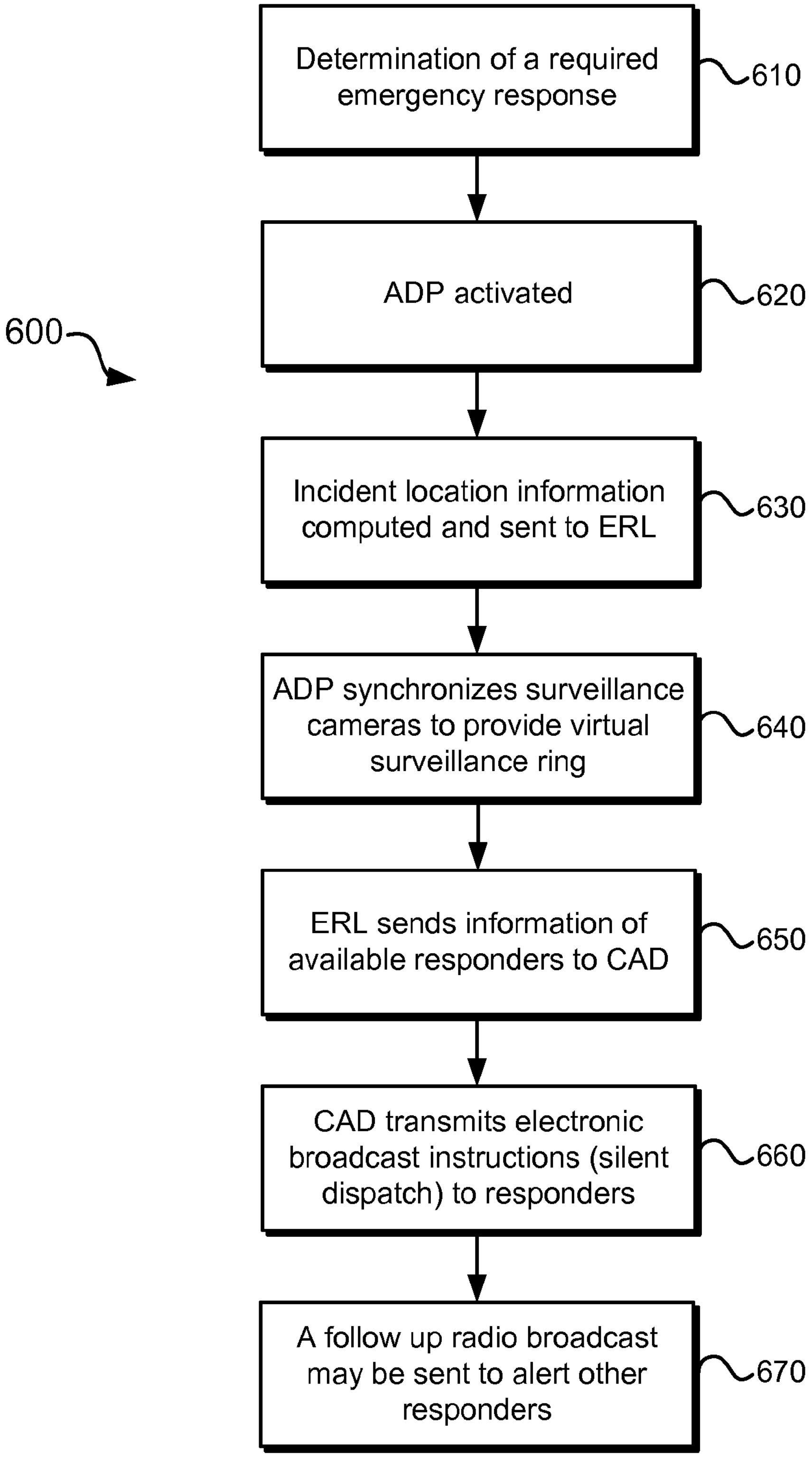
FIG. 6 is a flow chart that illustrates activation of an automated dispatch protocol that provides virtual surveillance, in accordance with an embodiment of the disclosure.

FIG. 6 is a flow chart that illustrates activation of an automated dispatch protocol that provides virtual surveillance, in accordance with an embodiment of the disclosure. Referring to FIG. 6, the automated dispatch protocol may be integrated with and/or operated in connection with the smart sensors 115, the CCTVs 120, the networked surveillance cameras 125, and the ERL system 160. At 610, the automated dispatch protocol may start with, for example, a smart image sensor alert and/or a CCTV/network surveillance camera operator observation of a matter of police interest. For example, the operator that is viewing streaming video from a smart video sensor, a CCTV, or a network surveillance camera, may determine that an event warrants an automated dispatch protocol response (e.g., a crime in progress or about to occur). Upon activation of the automated dispatch protocol at 620, the sensors and/or cameras may transmit, at 630, incident location information to the ERL system 160. The incident location information may have been computed by the automated dispatch protocol from sensor and/or camera coordinates. At 640, the automated dispatch protocol may also enable synchronization of one or more sensors and/or cameras in the area to form a virtual surveillance ring around the incident location. At 550, the ERL system 160 may generate and transmit information about the locations of emergency responders to the CAD/RMS 170. At 660, the CAD/RMS 170 may electronically transmit emergency dispatch instructions to the two closest available police/emergency responder units, for example, if such a respond is consistent with the dispatch scheme for that type of incident. Optionally, at 670, the automated dispatch protocol may be followed by radio broadcast to alert other emergency units in the area.

Figure 7:
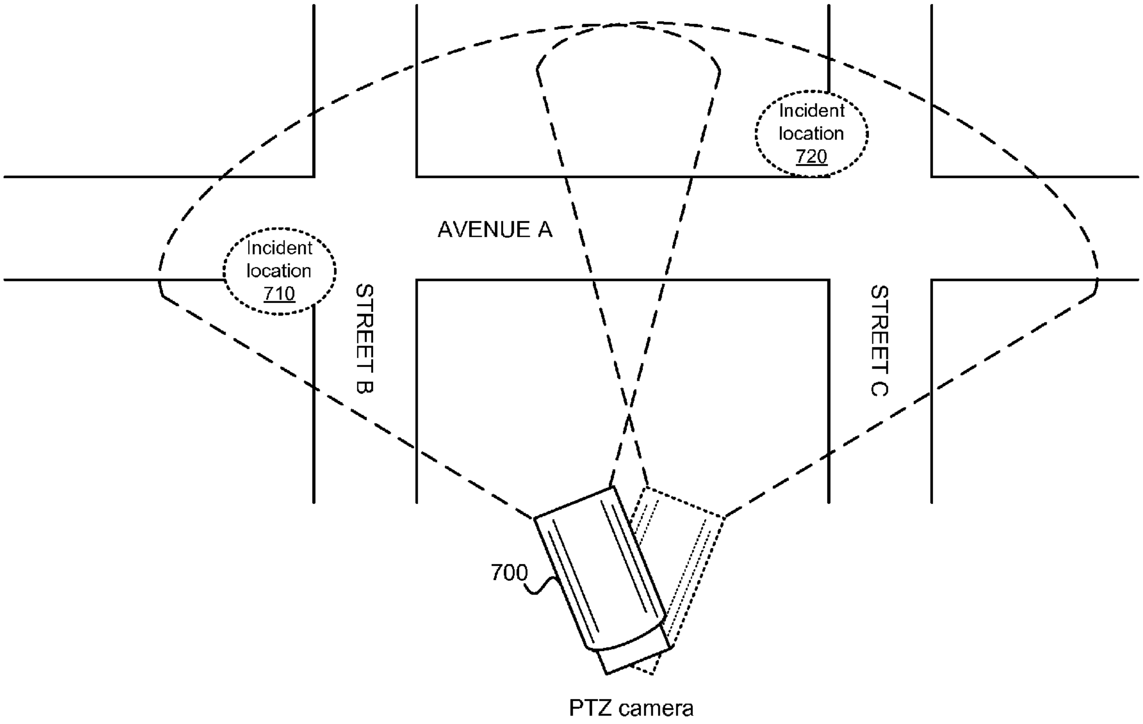
FIGS. 7 and 8 are diagrams that illustrate coordinate information from a pan-tilt-zoom (PTZ) camera for computing incident location information in an automated dispatch protocol, in accordance with embodiments of the disclosure.
Figure 8:
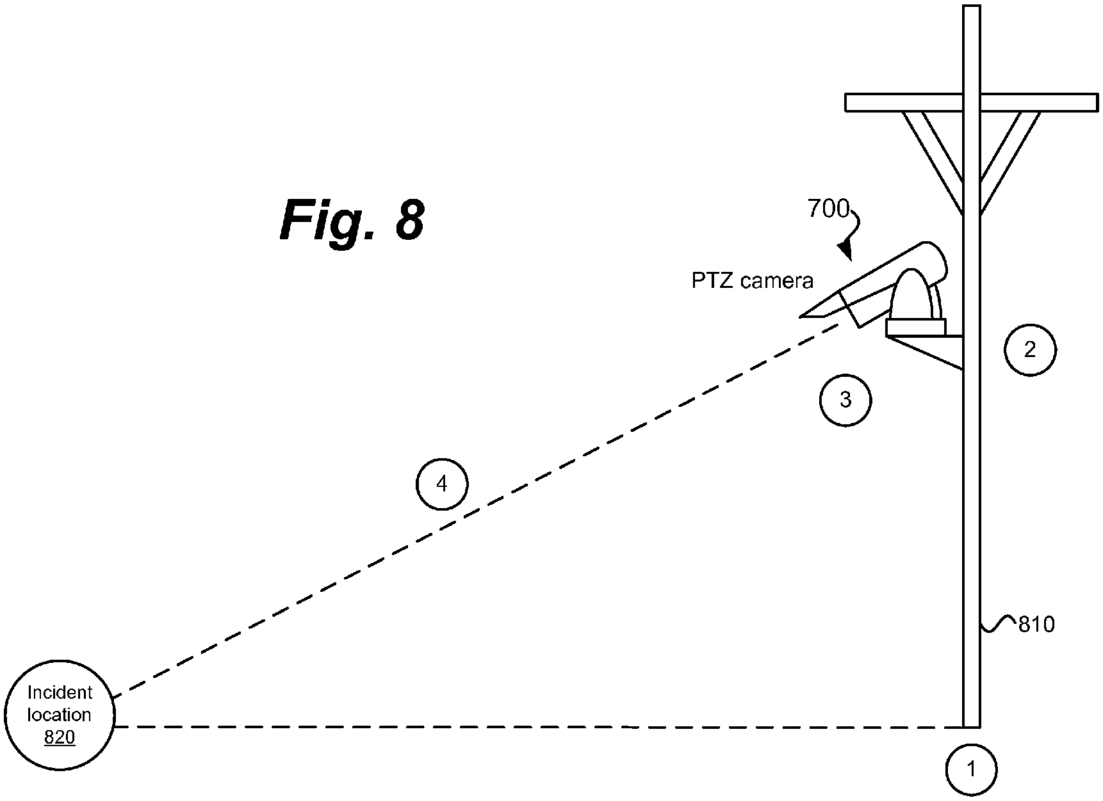

FIGS. 7 and 8 are diagrams that illustrate coordinate information from a pan-tilt-zoom (PTZ) camera for computing incident location information in an automated dispatch protocol, in accordance with embodiments of the disclosure. Referring to FIG. 7, there is shown a PTZ camera 700 that may be utilized with an emergency dispatch system such as the emergency dispatch system 110, for example. The PTZ camera 700 may pan across a geographical region and may enable an operator of the emergency dispatch system to determine whether a matter of interest is occurring within the field of view of the PTZ camera 700.

In the example shown in FIG. 7, when an incident is determined to be of interest at location 710 and an automated dispatch protocol is activated, the PTZ camera 700 may communicate panning coordinates that corresponds to the view at which the operator noticed the incident. In this instance, the panning coordinates may be utilized by the automated dispatch protocol to determine that the intersection of Avenue A and Street B is the location of the incident. The automated dispatch protocol may provide the street information to the ERL system 160 and/or the CAD/RMS 170. The location of the incident may be presented on a map that is shown on a display device to aid an operator in carrying out other emergency operations related to the incident.

Also shown in FIG. 7, when an incident is determined to be of interest at location 720 and an automated dispatch protocol is activated, the PTZ camera 700 may communicate panning coordinates that corresponds to the view at which the operator noticed the incident. In this instance, the panning coordinates may be utilized by the automated dispatch protocol to determine that the intersection of Avenue A and Street C is the location of the incident. The automated dispatch protocol may provide the street information to the ERL system 160 and/or the CAD/RMS 170. The location of the incident may be presented on a map that is shown on a display device to aid an operator in carrying out other emergency operations related to the incident.

Referring to FIG. 8, there is shown a structure 810 to which the PTZ camera 700 is attached. In this instance, the location 820 of an incident of interest may be determined based on coordinates and/or other orientation information from the PTZ camera 700. For example, the coordinates of the location of the structure 810 (labeled "1"), the height above ground at which the PTZ camera 700 is attached (labeled "2"), and the tilt angle of the PTZ camera 700 (labeled "3") may be utilized. The hypotenuse (labeled "4") may be computed from 2, 3, and the assumption of a 90 degree angle between the structure 810 and the ground. The length of the hypotenuse may be utilized to determine the incident location 810.

The automated dispatch protocol may receive the coordinate information and/or other orientation information from the PTZ camera 700 to convert such information to street information that corresponds to the location of the incident. The street information may be computed within a certain threshold level that is acceptable for emergency responses. For example, street information that is accurate to within 50 feet may be deemed acceptable for dispatching emergency responders. Once the street information that corresponds to the location of the incident is determined, the automated dispatch protocol may provide the street information to the ERL system 160 and/or the CAD/RMS 170. In some embodiments of the disclosure, instead of determining street information, the automated dispatch protocol may determine a value that is equivalent to a GPS value and may communicate such a value to the ERL system 160 and/or the CAD/RMS 170.

The above-described automated dispatch protocol may have dispatch times that take approximately one second to complete, compared to a typical emergency dispatch time of about 2 minutes and 29 seconds.

There are additional considerations when the automated dispatch protocol is integrated with and/or operated in connection with the ERL system 160. Typical conventional 911 systems use geographical area of assignment rather than actual responder location as the basis for emergency dispatch, which often contributes to higher response times. The automated dispatch protocol may reduce emergency response times by integrating GPS information to locate the closest available emergency responders to the location of the incident and/or the emergency responders that can reach the location of the incident fastest.

The integration of the automated dispatch protocol with conventional CCTV systems and with smart sensors may have additional considerations. For example, typical emergency 911 calls to the police involve an occurring or completed crime or event, thus marginalizing the emergency 911 system's crime intervention potential. Smart sensor and/or CCTV operator detections of unfolding criminal activity provide a window of opportunity, even if small, for police intervention. The automated dispatch protocol may allow the police or other emergency responder to change the dynamics of the situation and to shape outcomes by deploying emergency responders rapidly almost without human intervention. Such an approach may reduce dispatch times down to abut one second while significantly slashing travel times.

While the integration of the automated dispatch protocol may involve the use of emergency 911 or other similar dispatch systems to electronically transmit dispatch instructions to wireless in-vehicle devices (e.g., laptops) and/or wireless personal devices (e.g., smart phones), the disclosure need not be so limited. The automated dispatch protocol may also comprise the generation and transmission of instant dispatch instructions, signals, and/or commands from other communications systems and dispatch messages received through other devices. Moreover, a variety of GPS devices may be used to locate and identify suitable emergency responders.

Similarly, the automated dispatch protocol may be activated from other locations or communications centers. For example, an automated dispatch protocol related alarm may be transmitted from within sensitive locations and/or from critical infrastructure or though a commercial alarm system. Other examples of automated dispatch protocol integration may include alarms or alerts for banks and other commercial entities (e.g., holdup alarm), schools or college campuses (e.g., intruders, active shooter, or other critical incident), government buildings, private and public high value infrastructure, and secure locations (e.g., bomb threats, suspicious devices, security breaches).

Aspects of the disclosure comprise a method for handling emergency responses in which display information may be generated for a plurality of dispatch schemes, wherein each of the plurality of dispatch schemes corresponds to a different type of emergency response. The display information may be generated in a viewing station such as viewing stations 150*a* and 150*b*, for example. The display information may correspond to graphical icons such as, but not limited to, the graphical icons illustrated in FIG. 3. One of the plurality of dispatch schemes may be selected as part of an automated dispatch protocol associated with the plurality of dispatch schemes. The selection may take place at a viewing station in which the display information is being presented and may be based on an input received, such as an input provided by an operator at the viewing station, for example. Based on the selected dispatch scheme, the viewing station may generate one or more signals to be utilized by CAD system (e.g., the CAD/RMS 170) to generate electronic broadcast instructions that are to be wirelessly transmitted to one or more emergency responders. The emergency responders may be associated with the wireless personal devices 180*a*, the wireless in-vehicle devices 180*b*, and the emergency services 190 shown in FIGS. 1A and 1B, for example.

The one or more signals generated by the viewing station may comprise information that is utilized by the CAD/RMS 170 to identify the one or more emergency responders for the selected dispatch scheme. A viewing station, such as the viewing station 150*a*, for example, may receive incident location information, wherein the one or more signals generated by the viewing station 150*a* and to be utilized by the CAD/RMS 170 comprise the incident location information. The incident location information may be received in connection with a 911 call, for example, and through the emergency call interface module 240 shown in FIG. 2A.

The viewing station may generate, based on the selected dispatch scheme, one or more signals comprising information that is utilized by an emergency responder locator, such as the ERL system 160, for example, to identify the one or more emergency responders.

A viewing station, such as the viewing station 150*b*, for example, may receive sensor coordinates associated with an incident location and may convert the sensor coordinates to incident location information, wherein the one or more signals to be utilized by the CAD/RMS 170 comprise the incident location information. The sensor coordinates may refer to coordinates for a smart sensor 115, a CCTV 120, or a networked surveillance camera 125. Examples of coordinates that may be received are described above with respect to FIGS. 7 and 8.

A viewing station, such as the viewing station 150*b*, for example, may receive sensor coordinates associated with an incident location and may convert the sensor coordinates to incident location information. Moreover, the viewing station 150*b* may generate, based on the selected dispatch scheme, one or more signals to be utilized by an emergency responder locator, such as the ERL system 160, to identify the one or more emergency responders, wherein the one or more signals to be utilized the ERL system 160 comprise the incident location information.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein for an automated dispatch protocol.

Accordingly, the present disclosure may be realized in hardware, software, or a combination of hardware and software. The present disclosure may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for handling emergency responses, comprising:

displaying, in response to an activation input, a plurality of graphics at the same time in a graphical user interface, each of the graphics corresponding to a different dispatch scheme for responding to an incident, each of the dispatch schemes corresponding to a different type of emergency response and having rules that define a set of emergency responder options, and each of the emergency responder options having a fixed number and combination of initial emergency responders from different emergency agencies based on the type of emergency response and the geographical area associated with the incident;

receiving an input to select one of the plurality of graphics and its corresponding dispatch scheme;

identifying multiple emergency responders for the selected dispatch scheme based on the respective set of emergency responder options by determining availability of the initial emergency responders and determining availability of a next emergency responder only when one or more of the initial emergency responders is unavailable, wherein the initial emergency responders and the next emergency responder are selected based at least in part on a location of the respective emergency responder and dynamic calculations to a location of the incident that take into account traffic and road considerations, and wherein the location of the respective emergency responder is updated using navigation system information; and generating, based on the selected dispatch scheme, one or more signals to be utilized by a computer-aided dispatcher (CAD) to generate electronic broadcast instructions that are to be wirelessly transmitted to the identified emergency responders.

2. The method of claim 1, wherein the selection of the one dispatch scheme is in response to input provided by an operator of a viewing station in which the display information is presented.

3. The method of claim 1, wherein the one or more signals comprise information that is utilized by the CAD to identify the emergency responders for the selected dispatch scheme.

4. The method of claim 1, comprising receiving incident location information having the location of the incident, wherein the one or more signals to be utilized by the CAD comprise the incident location information.

5. The method of claim 1, comprising generating, based on the selected dispatch scheme, one or more signals comprising information that is utilized by an emergency responder locator to identify the emergency responders.

6. The method of claim 1, comprising:

displaying a video feed from a surveillance camera, the activation input being received in response to an incident detected in the video feed being displayed;

receiving, from the same surveillance camera and in response to the activation input, sensor coordinates associated with the location of the incident; and converting the sensor coordinates to incident location information, wherein the one or more signals to be utilized by the CAD comprise the incident location information.

7. The method of claim 6, further comprising:

identifying street information from the incident location information; and displaying, based on the street information, the location of the incident in a map for operator usage.

8. The method of claim 1, comprising:

displaying a video feed from a surveillance camera, the activation input being received in response to an incident detected in the video feed being displayed;

receiving, from the same surveillance camera and in response to the activation input, sensor coordinates associated with the location of the incident;

converting the sensor coordinates to incident location information; and generating, based on the selected dispatch scheme, one or more signals to be utilized by an emergency responder locator to identify the emergency responder, wherein the one or more signals to be utilized by the emergency responder locator comprise the incident location information.

9. A non-transitory computer readable media having stored thereon a computer program having at least one code section for handling emergency responses, the at least one code section being executable by a computer to cause the computer to perform steps comprising:

displaying, in response to an activation input, a plurality of graphics at the same time in a graphical user interface, each of the graphics corresponding to a different dispatch scheme for responding to an incident, each of the dispatch schemes corresponding to a different type of emergency response and having rules that define a set of emergency responder options, and each of the emergency responder options having a fixed number and combination of initial emergency responders from different emergency agencies incident;

receiving an input to select one of the plurality of graphics and its corresponding dispatch scheme;

identifying multiple emergency responders for the selected dispatch scheme based on the respective set of emergency responder options by determining availability of the initial emergency responders and determining availability of a next emergency responder only when one or more of the initial emergency responders is unavailable, wherein the initial emergency responders and the next emergency responder are selected based at least in part on a location of the respective emergency responder and dynamic calculations to a location of the incident that take into account traffic and road considerations, and wherein the location of the respective emergency responder is updated using navigation system information; and generating, based on the selected dispatch scheme, one or more signals to be utilized by a computer-aided dispatcher (CAD) to generate electronic broadcast instructions that are to be wirelessly transmitted to the identified emergency responders.

10. The non-transitory computer readable media of claim 9, wherein the selection of the one dispatch scheme is in response to input provided by an operator of a viewing station in which the display information is presented.

11. The non-transitory computer readable media of claim 9, wherein the one or more signals comprise information that is utilized by the CAD to identify the emergency responders for the selected dispatch scheme.

12. The non-transitory computer readable media of claim 9, wherein:

the at least one code section comprises code for receiving incident location information having the location of the incident;

and the one or more signals to be utilized by the CAD comprise the incident location information.

13. The non-transitory computer readable media of claim 9, wherein the at least one code section comprises code for generating, based on the selected dispatch scheme, one or more signals comprising information that is utilized by an emergency responder locator to identify the emergency responders.

14. The non-transitory computer readable media of claim 9, wherein the at least one code section comprises code for:

displaying a video feed from a surveillance camera, the activation input being received in response to an incident detected in the video feed being displayed;

receiving, from the same surveillance camera and in response to the activation input, sensor coordinates associated with the location of the incident; and converting the sensor coordinates to incident location information, wherein the one or more signals to be utilized by the CAD comprise the incident location information.

15. The non-transitory computer readable media of claim 14, wherein:

the at least one code section comprises code for identifying street information from the incident location information; and the at least one code section comprises code for displaying, based on the street information, the location of the incident in a map for operator usage.

16. The non-transitory computer readable media of claim 9, wherein the at least one code section comprises code for:

displaying a video feed from a surveillance camera, the activation input being received in response to an incident detected in the video feed being displayed;

receiving, from the same surveillance camera and in response to the activation input, sensor coordinates associated with the location of the incident;

converting the sensor coordinates to incident location information; and generating, based on the selected dispatch scheme, one or more signals to be utilized by an emergency responder locator to identify the emergency responder, wherein the one or more signals to be utilized by the emergency responder locator comprise the incident location information.

17. A system for handling emergency responses, comprising:

one or more processors that are operable to:

display, in response to an activation input, a plurality of graphics at the same time in a graphical user, each of the graphics corresponding to a different dispatch scheme for responding to an incident, each of the dispatch schemes corresponding to a different type of emergency response and having rules that define a set of emergency responder options, and each of the emergency responder options having a fixed number and combination of initial emergency responders from different emergency agencies based on the type of emergency response and the geographical area associated with the incident;

receive input to select one of the plurality of graphics and its corresponding dispatch scheme; and identify multiple emergency responders for the selected dispatch scheme from the respective set of emergency responder options by determining availability of the initial emergency responders and determining availability of a next emergency responder only when one or more of the initial emergency responders is unavailable, wherein the initial emergency responders and the next emergency responder are selected based at least in part on a location of the respective emergency responder and dynamic calculations to a location of the incident that take into account traffic and road considerations, and wherein the location of the respective emergency responder is updated using navigation system information; and generate, based on the selected dispatch scheme, one or more signals to be utilized by a computer-aided dispatcher (CAD) to generate electronic broadcast instructions that are to be wirelessly transmitted to the identified emergency responder.

18. The system of claim 17, wherein the selection of the one dispatch scheme is in response to input provided by an operator of a viewing station in which the display information is presented.

19. The system of claim 17, wherein the one or more signals comprise information that is utilized by the CAD to identify the emergency responders for the selected dispatch scheme.

20. The system of claim 17, wherein:

the one or more processors are operable to receive incident location information having the location of the incident; and the one or more signals to be utilized by the CAD comprise the incident location information.

21. The system of claim 17, wherein the one or more processors are operable to generate, based on the selected dispatch scheme, one or more signals comprising information emergency responder locator to identify the emergency responders.

22. The system of claim 17, wherein the one or more processors are operable to:

display a video feed from a surveillance camera, the activation input being received in response to an incident detected in the video feed being displayed;

receive, from the same surveillance camera and in response to the activation input, sensor coordinates associated with the location of the incident; and convert the sensor coordinates to incident location information, wherein the one or more signals to be utilized by the CAD comprise the incident location information.

23. The system of claim 22, wherein the one or more processors are operable to:

identify street information from the incident location information; and display, based on the street information, the location of the incident in a map operator usage.

24. The system of claim 17, wherein the one or more processors are operable to:

display a video feed from a surveillance camera, the activation input being received in response to an incident detected in the video feed being displayed;

receive, from the same surveillance camera and in response to the activation input, sensor coordinates associated with the location of the incident;

convert the sensor coordinates to incident location information; and generate, based on the selected dispatch scheme, one or more signals to be utilized by an emergency responder locator to identify the emergency responder, wherein the one or more signals to be utilized by the emergency responder locator comprise the incident location information.

25. The system of claim 17, wherein the one or more processors are operable to synchronize the surveillance camera with one or more other surveillance cameras using the CAD to form a virtual surveillance ring around the location of the incident associated with the activation input.

* * * * *